(12) United States Patent
Diedrichs et al.

(10) Patent No.: US 9,985,561 B2
(45) Date of Patent: May 29, 2018

(54) METHOD AND APPARATUS FOR FEEDING ELECTRIC ENERGY INTO AN ELECTRIC SUPPLY GRID

(71) Applicant: Wobben Properties GmbH, Aurich (DE)

(72) Inventors: Volker Diedrichs, Wardenburg (DE); Kai Busker, Grossefehn (DE); Alfred Beekmann, Wiesmoor (DE)

(73) Assignee: Wobben Properties GmbH, Aurich (DE)

(*) Notice: Subject to any disclaimer, the term of this patent is extended or adjusted under 35 U.S.C. 154(b) by 0 days. days.

(21) Appl. No.: 14/414,420

(22) PCT Filed: Jul. 3, 2013

(86) PCT No.: PCT/EP2013/064069
§ 371 (c)(1),
(2) Date: Jan. 12, 2015

(87) PCT Pub. No.: WO2014/009226
PCT Pub. Date: Jan. 16, 2014

(65) Prior Publication Data
US 2015/0280629 A1    Oct. 1, 2015

(30) Foreign Application Priority Data

Jul. 13, 2012    (DE) .................. 10 2012 212 364

(51) Int. Cl.
*F03D 9/00* (2016.01)
*H02P 9/04* (2006.01)
(Continued)

(52) U.S. Cl.
CPC ............ *H02P 9/105* (2013.01); *F03D 7/0284* (2013.01); *F03D 9/255* (2017.02); *F03D 9/257* (2017.02);
(Continued)

(58) Field of Classification Search
CPC ............ H02P 9/105; H02P 9/02; F03D 9/005
(Continued)

(56) References Cited

U.S. PATENT DOCUMENTS 6,891,281 B2    5/2005    Wobben
6,965,174 B2    11/2005   Wobben
(Continued)

FOREIGN PATENT DOCUMENTS

DE    10 2007 018 888 A1    10/2008
DE    10 2007 044 601 A1    4/2009
(Continued)

OTHER PUBLICATIONS

Diedrichs et al., "Loss of (Angle) Stability of Wind Power Plants—The Underestimated Phenomenon in Case of Very Low Short Circuit Ratio," 10th International Workshop on Large-Scale Integration of Wind Power into Power Systems, Transmission Networks for Offshore Wind Farms, Aarhus Denmark, Oct. 25-26, 2011, 8 pages.

(Continued)

*Primary Examiner* — Tulsidas C Patel
*Assistant Examiner* — Thomas Quigley
(74) *Attorney, Agent, or Firm* — Seed IP Law Group LLP

(57) ABSTRACT

The invention relates to a method for controlling a generator of electric energy that is connected to an electric supply grid on a grid connection point, comprising the following steps: incorporating at least one grid characteristic of the electric supply grid related to the grid connection point, and controlling the generator in such way that it feeds power into the electric supply grid depending on the incorporated grid characteristic.

20 Claims, 7 Drawing Sheets

(51) Int. Cl.
*H02P 9/10* (2006.01)
*H02J 3/24* (2006.01)
*F03D 7/02* (2006.01)
*H02P 9/02* (2006.01)
*F03D 9/25* (2016.01)

(52) U.S. Cl.
CPC .................. *H02J 3/24* (2013.01); *H02P 9/02* (2013.01); *F05B 2270/337* (2013.01); *Y02E 10/723* (2013.01); *Y02E 10/726* (2013.01)

(58) Field of Classification Search
USPC ..................................................... 290/44, 55
See application file for complete search history.

(56) References Cited

U.S. PATENT DOCUMENTS

| | | |
|---|---|---|
| 6,984,898 B2 | 1/2006 | Wobben |
| 7,462,946 B2 | 12/2008 | Wobben |
| 7,462,947 B2 | 12/2008 | Wobben |
| 9,279,411 B2 | 3/2016 | Beekmann et al. |
| 2003/0057924 A1* | 3/2003 | Shimomura ............ H02P 9/305 322/28 |
| 2007/0055408 A1* | 3/2007 | Delmerico ................ H02J 3/06 700/286 |
| 2007/0233406 A1* | 10/2007 | Delmerico ......... G01R 19/2513 702/65 |
| 2010/0094477 A1* | 4/2010 | Berggren ................ H02J 3/005 700/297 |
| 2010/0148508 A1 | 6/2010 | Garcia |
| 2010/0237834 A1 | 9/2010 | Alonso Sadaba et al. |
| 2010/0312409 A1 | 12/2010 | Zeumer et al. |
| 2011/0043189 A1* | 2/2011 | Bauer ...................... G01D 1/02 324/119 |
| 2011/0049994 A1* | 3/2011 | Hiller ...................... F03D 9/002 307/82 |
| 2012/0101640 A1 | 4/2012 | Stapelfeldt |

FOREIGN PATENT DOCUMENTS

| | | |
|---|---|---|
| DE | 10 2011 053 237 A1 | 3/2012 |
| EP | 1 841 037 A2 | 10/2007 |
| EP | 1 909 370 A1 | 4/2008 |
| EP | 2 299 555 A1 | 3/2011 |
| EP | 2 325 968 A1 | 5/2011 |
| JP | 2004-532595 A | 10/2004 |
| JP | 20100187482 A | 8/2010 |
| RU | 2 074 475 C1 | 2/1997 |
| RU | 2 153 752 C1 | 7/2000 |
| TW | 522202 B | 3/2003 |
| WO | 00/73652 A1 | 12/2000 |
| WO | 2009/083448 A2 | 7/2009 |
| WO | 2010/060903 A1 | 6/2010 |
| WO | 2010/108910 A2 | 9/2010 |

OTHER PUBLICATIONS

Schiemenz, I. et al., "Control of a Permanent Magnet Synchronous Generator Used in a Variable Speed Wind Energy System," *IEEE International Electric Machines and Drives Conference 2001* (IEMDC 2001), Jun. 20, 2001; pp. 872-877; 6 pgs.

Diedrichs et al., "Control of Wind Power Plants Utilizing Voltage Source Converter in High Impedance Grids," *IEEE Power & Energy Society General Meeting*, San Diego, California, USA, Jul. 22-26, 2012, 10 pages.

Kuehn, "Control and Stability of Power Inverters Feeding Renewable Power to Weak AC Grids with No or Low Mechanical Inertia," *Power Systems Conference and Exposition*, Seattle, Washington, USA, Mar. 15-18, 2009, 9 pages.

* cited by examiner

METHOD AND APPARATUS FOR FEEDING ELECTRIC ENERGY INTO AN ELECTRIC SUPPLY GRID

BACKGROUND

Technical Field

The present invention relates to a method for controlling a generator of electric energy which is connected to an electric supply grid in a grid connection point. In addition, the present invention relates to such a generator of electric energy.

Description of the Related Art

Feeding electric energy into an electric supply grid, such as the European grid or the US power grid, is generally known. The electric supply grid as described below refers to the widely accepted AC voltage grid. This does not exclude the presence of DC voltage sections in the grid. Likewise, frequency-independent aspects may generally also refer to a DC voltage grid. Historically, energy is fed into an electric supply grid with a large power station that drives a synchronous generator using primary energy, such as coal, nuclear energy or gas. Depending on the number of pole pairs and the speed of the synchronous generator, this generator feeds into the supply grid with a certain frequency. The synchronous generator may be technically controlled so as, for example, to adjust the output. However, such adjustment process can take a long time.

With changing situations in the supply grid that is to be fed, the physical reaction of the synchronous generator often causes a change in the grid condition, at least for a short time. For example, the speed of the synchronous generator increases if the supply grid is not able to take the power completely that is or can be provided by the synchronous generator. This excess power then accelerates the synchronous generator, which results in an increased feeding frequency. Accordingly, the frequency in the supply grid may increase.

When feeding into a supply grid, the grid stability must also be taken into account. The loss of grid stability, i.e., the loss of the stability of the supply grid, may result in the feeding generator being powered off. Such a loss of stability, which is referred to as such and abbreviated as "LOS" among German-speaking experts, describes physical processes that no longer allow for a continued operation and must be terminated by cutoffs. In the case of power plants, this affects their output, and can thus contribute to an escalation of the so-called deficit output. In the worst case, this loss of stability leads to a total energy system failure due to error cascading and deficit accumulation. Such total failures are very rare; however, one occurred in Italy on 24 Sep. 2004.

Loss of grid stability, i.e., the so-called loss of stability, is a phenomenon which involves at first a loss of angular stability that may eventually cause a loss of voltage stability.

Overcurrents to be achieved are determined as stability criteria, which can be provided in the case of a loss of stability. This requires the systems to have a certain design. A new power plant, in particular a power plant that is to be newly built, is thus coordinated to the supply grid as is represented at the grid connection point to which the power plant is to be connected.

When connecting large power plants to an electric supply grid, the short circuit current ratio is an important criterion; this is known among German specialists as "short circuit radio" and abbreviated as "Scr". This short circuit current ratio is the ratio of the short circuit power to the connected load. Short circuit power is the power that the respective supply grid on the considered grid connection point, to which the power plant is to be connected, can provide in the case of a short circuit. The connected load is the connected load of the power plant that is to be connected, in particular the nominal capacity of the generator that is to be connected.

To secure reliable operation, i.e., to avoid a loss of stability to the greatest extent possible, power plants are generally designed for the respective grid connection point in such a way that the short circuit current ratio is higher than 10, normally even higher than 15. The supply grid can then provide a relatively high short circuit power at the grid connection point. That means that the grid has a low grid impedance and is referred to as a strong grid.

In the case of a weak grid, in other words, in the presence of a high impedance, feeding is only possible with a low connected load, i.e., only a power plant with a low connected load can be connected. This usually leads to the fact that either a new power plant cannot be connected to such a grid connection point, or the grid has to be changed, particularly by equipping it with further, more powerful lines. This is generally referred to as grid reinforcement.

For feeding electric energy by decentralized generation units, in particular wind power installations, the problem of the grid's loss of stability is basically unknown. Already at the end of the nineties, first proposals were made to ensure that wind power installations also contribute to the electric support of the grid. This, however, does not take into account the cause of a loss of stability, in particular that feeding into the supply grid can cause a loss of stability.

For example, the German patent application U.S. Pat. No. 6,891,281 describes a method in which wind power installations can change and, in particular, reduce their power feed-in depending on the grid frequency. U.S. Pat. No. 7,462,946 suggests that in the case of a grid failure, particular in the case of a short circuit, a wind power installation limits the power that it feeds-in instead of being disconnected from the grid in order to achieve a grid support. U.S. Pat. No. 6,965,174 describes a method for supporting the grid by means of a wind power installation that, depending on the grid voltage, adjusts a phase angle of the fed-in electricity, and thus feeds reactive power into the grid depending on the voltage so as to support the grid. U.S. Pat. No. 6,984,898 also relates to a method for supporting the grid by means of a wind power installation in which the wind power installation reduces, depending on the grid voltage, the power that is to be fed into the grid, particularly so as to avoid a disconnection from the grid in order to support the grid by means of a wind power installation.

The fact that such decentralized generation units, such as wind power installations, may be the underlying cause for the loss of stability in the grid has not been taken into account. In the essay "Loss of (Angle) Stability of Wind Power Installations" by V. Diedrichs et al., submitted for and presented at the "10th International Workshop on Large-Scale Integration of Wind Power into Power Systems as well as on Transmission Grids for Offshore Wind Farms, Aarhus (Denmark), 25-26 Oct. 2011". There, reference was basically made to the problem that the loss of stability in the grid can basically also occur for wind power installations that are connected to the supply grid for feed-in. This essay essentially raises awareness of the problem and is hereby incorporated herein by reference in its entirety. In particular, its technical explanations also apply to the present application.

Basically, findings, experience and other knowledge of the operation and connection of large power plants to the electric supply grid cannot be transferred to wind power installations, including large wind parks with numerous wind power installations that are connected to the supply grid for feed-in. The responsible expert who connects a power plant to a supply grid in order to operate it there is already a different expert from the one wanting to connect a wind power installation to the supply grid in order to operate it there. Wind power installations—and much of the following also applies to decentralized generation units—depend on wind and must therefore take a fluctuating energy source into account; they usually do not feed into the supply grid with a synchronous generator that is directly coupled to the grid, but use a voltage-based inverter instead; they have a different size than large power plants, whereby their nominal capacity is usually 3 powers of ten below that of a large power plant; they are usually subject to other political laws which often ensure the acceptance of the provision of power by the operators of electric supply grids; they are usually decentralized; and, they usually feed into a medium-voltage grid, whereas large power plants usually feed into an extra high voltage grid.

The German Patent and Trademark Office has found the following prior art in the priority application for the present application: DE 10 2011 053 237 A1, WO 2010/060903 A1, US 2010/0148508 A1, DE 10 2007 044 601 A1, DE 10 2007 018 888 A1, US 2010/0237834 A1 as well as the article by Volker Diedrichs et al., "Loss of (Angle) Stability of Wind Power Plants—The Underestimated Phenomenon in Case of Very Low Short Circuit Ratio-".

BRIEF SUMMARY

One or more embodiments of the present invention may address at least one of the problems mentioned above. One embodiment is directed to decentralized generation units, such as wind power installations, that can be operated in such a way as to consider the phenomenon of the supply grid's loss of stability. In particular, a solution is to be proposed in which decentralized generation units, such as wind power installations or wind parks, contribute to grid stability by preventing a loss of stability with regard to the grid. An alternative solution should at least be provided.

One embodiment is directed to a generator of electric energy connected to an electric supply grid on a grid connection point is controlled. As a purely precautionary measure, it is pointed out that a generator of electric energy converts existing energy to electric energy, which is here simply referred to as generation. According to the proposed control method, at least one grid characteristic of the electric supply grid is incorporated with regard to the grid connection point. The grid characteristic incorporated here is in particular the grid's behavior with regard to stability under different operating conditions of the grid and/or under different conditions for feed-in or boundary conditions for feed-in. In particular, grid characteristics are incorporated describing the supply grid behavior in the case of deviations from the nominal operating point.

In addition, it is proposed to feed electric power into the electric supply grid based on this incorporated grid characteristic. Thus, controlling the feed-in depends on the predetermined grid characteristic. This is to be distinguished from the technical design of the generator, in which the control does not take the grid characteristics into account. Control of the feed-in depending on the incorporated grid characteristics is also to be distinguished from the control depending on actual grid conditions. Equally, it is also advantageous, in addition to the control of the feed-in depending on the incorporated grid characteristic, to design the generator according to the incorporated grid characteristic and to perform the control depending on grid conditions, which is, however, not the primary subject matter of this application.

Pursuant to one or more embodiments of the invention, it was recognized that in particular considering the grid characteristic when designing the connected generator or the generator that is to be connected may be an incomplete consideration. This applies in particular to decentralized generation units or decentralized generators that are able to adapt dynamically to new situations. However, an adaption to new situations, i.e., to changed conditions in the supply grid, carries the risk that any current problems in the supply grid might not be completely resolved. Only if at least one previously incorporated grid characteristic is considered can the feed of electric power into the electric supply grid be proactively controlled. Such proactive control primarily aims at the early avoidance, or at least detection, of stability issues in the supply grid, particularly with regard to a loss of stability.

It is proposed to apply this control method preferably to a so-called decentralized generator and/or a wind power installation or a wind park containing several wind plants. A wind power installation is usually a decentralized generator, since it is installed at remote locations that depend in particular on wind conditions, and, due to their connected load, they cannot be viewed as a central energy source, as opposed to large power plants. The same usually also applies to a wind park with several wind power installations. In addition, wind power installations and small wind parks are basically connected to an existent supply grid. A connecting line or several connecting lines might be provided for a connection to this supply grid. However, the basic structure of the supply grid remains unchanged.

Until now, it had been assumed that a connection of such decentralized generators had no major impact on the basic characteristic and the basic structure of the respective supply grid. It was examined whether the respective grids had enough capacity for a connection of the decentralized supplier, i.e., whether they had sufficient capacity to transport the additional power to be fed in and which was expected from the decentralized generator. In particular, aspects of the grid stability established through the feed-in of this generator have practically been ignored. In particular, with regard to such decentralized generators, the extent to which their feed-in of electric energy could cause a loss of stability of the supply grid has been ignored. The present method is therefore directed in particular at such decentralized suppliers, in particular wind power installations and wind parks.

The feed-in, particularly by decentralized generators, is preferably performed by means of a voltage inverter. With such feed-in by means of a voltage inverter, an inverter is used to which the energy that is to be fed is provided, e.g., on a DC intermediate circuit, and the voltage inverter produces a voltage change signal that is as sinusoidal as possible. This voltage change signal, often by using a line choke, will lead to power that is to be fed into the supply grid. Further voltage transformations by means of one or several voltage transformers can be provided.

Here, a so-called full power conversion concept is particularly proposed, whereby all of the electric power that is to be fed is done so into the supply grid by means of this voltage inverter. Losses are not considered here. With regard to wind power installations, other concepts with a voltage inverter are to be considered, whereby the voltage inverter controls the feed-in of electric power indirectly via the control of a generator that generates the power, in particular a double-feed asynchronous generator.

Using a voltage inverter to feed-in electric power of a supply grid, in particular according to the full power conversion concept, is essentially different from feeding electric power through a large power plant. The voltage inverter can and/or has to constantly adapt the voltage amplitude and frequency of its feed-in, depending on the grid condition. As a result, it is able to react promptly to changes in the grid. This bears the risk that it becomes unstable quickly if this prompt reaction is performed incorrectly. It is this problem in particular that is addressed by one or more embodiments of the invention.

According to one embodiment, it is proposed that the generator be controlled in such a way that it is controlled in an operating point that depends on the incorporated grid characteristics. In particular, it not only depends on these incorporated characteristics, but also on the voltage amplitude and the frequency in the supply grid, namely on or near the grid connection point. Furthermore, it may depend on the currently fed-in active power and/or the currently fed-in reactive power. This results at first in a nominal operating point designed for this grid connection point with the respective incorporated grid characteristic and for the specific generator. With changing conditions of the grid or of the feed-in, another operating point may be selected which takes the previously incorporated grid characteristic into consideration. The generator's operating point on the grid connection point is preferably specified by the active power and/or the reactive power that the generator feeds into the supply grid.

According to one embodiment, it is proposed that at least one control characteristic, which depends on the incorporated grid characteristic, be applied to set the operating point. Such a control characteristic can also be multidimensional, i.e., it can depend on several input parameters and/or comprise several parameters for setting at the same time. In particular, the control characteristic, depending on the grid voltage at the grid connection point, determines the reactive power and/or the active power that is to be fed-in. The control characteristic is created on the basis of the at least one incorporated grid characteristic. In particular, the characteristic is selected so as to ensure that the operation of the generator does not lead to a loss of stability of the supply grid.

According to one proposal, it is provided to use a nonlinear controller, in particular a controller with a nonlinear and/or inconstant controller characteristic. In particular, it is proposed to avoid using a PID controller as the exclusive controller. It has been recognized that a PID controller is insufficient for some requirements and that it does not meet the requirements with optimum parameterization. A nonlinear controller can better adapt to the system that is to be controlled. A nonlinear controller may be a fuzzy controller, a controller that is based on a neural grid, a multiplying controller, a controller with a hysteresis function and/or a controller using a dead time characteristic.

According to one embodiment, a controller is used that results in the operating point being adjusted according to the control characteristic. For example, such a control characteristic may specify the fed-in reactive power Q depending on the fed-in active power P and the voltage U in the grid, as described by the formula $Q=f(P,U)$.

Preferably, incorporating at least one grid characteristic, which can also be performed by calculating the grid characteristics, comprises the incorporation of a connection between fed-in reactive power and a grid voltage on the grid connection point. In addition or alternatively, it comprises the incorporation of a connection between the fed-in active power and the grid voltage at the grid connection point. Preferably, it comprises the incorporation of a connection between fed-in active power, fed-in reactive power and the grid voltage at the grid connection point, so that in this case, a three-dimensional connection is incorporated. Thus, a connection between reactive power, active power and grid voltage is incorporated, which reveals the supply grid's behavior with regard to this grid connection point, and may serve as a basis for the control of the generator when feeding into the supply grid.

According to one embodiment, it is proposed that incorporating the grid characteristic comprise the incorporation of a stability boundary. Such a stability boundary can be specified as a function of the grid voltage on the grid connection point, depending on the fed-in reactive power and the fed-in active power. This boundary is defined by three parameters, and can be illustrated three-dimensionally. In such a three-dimensional representation, the stability boundary basically has a curved or arched surface, namely a boundary surface. Accordingly, the respective operating points, and thus the characteristic provided by the operating points, are chosen on the stable side of the stability boundary. According to the expected dynamics of the supply grid and/or the generator, and thus in the case of a wind power Installation also of the wind, a small or great distance of the respective operating point from the stability boundary may be selected.

According to one embodiment, it is proposed that the at least one incorporated grid characteristic be calculated according to a model. For this purpose, a grid analysis of the supply grid is first performed, considering, for example, the line system, transformers in the supply grid, switching equipment, consumers, and generators. A transformer is hereinafter also simply referred to as a transformer. In particular, its values are entered into a calculation or simulation program. The grid analysis is specifically performed for the existent or planned grid connection point. Therefore, individual elements may be disregarded in the grid analysis if they are evidently no longer of significant relevance for the grid connection point. Respective grid sections can be considered through the use of equivalent models, in particular using substitute impedances. Then, a model of the supply grid is created, based on the grid analysis; this model can be edited and tested with a respective software for a grid analysis model. Next, in particular with such analysis software, and based on the grid model for the concrete grid connection point, a simulation of different operating points is performed, and the simulation results are recorded. The result of the simulation is the at least one incorporated grid characteristic. In particular, a plurality of the simulated individual operating points are determined or taken as a basis for this purpose.

It is noted that the term "supply grid" may also be used in its simple form "grid" or "grid".

Preferably, the stability boundary resulting, for example, from the above simulation, can be stored in a table. In addition or alternatively, it can also be approximated with an analytical function. Intermediate values that were not recorded may also be determined by interpolation.

According to one embodiment, it is proposed that, when incorporating the at least one grid characteristic, characteristics, or at least one characteristic, of the generator are (or is) to be considered as well, and that a short circuit current ratio is to be incorporated. The grid characteristics of the connection node are also incorporated on this power supply in consideration of the characteristics of the generator. Preferably, it is proposed that the generator be controlled with a short circuit current ratio of <6. Preferably, the short circuit current ratio is hereby <4, and in particular <2. Thus, a control method is suggested for a short circuit current ratio that is smaller than usual. This often requires that this specific design be implemented or at least accepted. It is deliberately proposed to feed into a weak grid, namely in particular with a generator, the connected load of which is large compared to the short circuit power of the grid with regard to the connection point, namely larger than one sixth, larger than a quarter or even larger than half the short circuit power of the grid for this connection point. It has thereby been recognized that using a wind power installation with a voltage source converter can simply be referred to as a voltage converter, in particular with a full converter structure, the operation of which is facilitated in a weak grid. It is deliberately accepted that by choosing or accepting a low short circuit current ratio, operation will occur near a stability boundary. It has been recognized that a control with a voltage converter can secure a respective control, in particular a respective fast and accordingly precise control of the feed-in. As a result, the grid connection points that have so far been regarded as unsuitable can now be used to connect a generator.

According to one embodiment, it is proposed that the operating point of the generator be selected with a predetermined stability reserve with regard to the stability boundary. Therefore, a specific selection of the operating point is proposed, so as to secure stability. This is particularly different from a concept foreseeing a design with a very high short circuit current ratio, whereby a concrete operating point was not selected. In other words, an overly cautious design is avoided. The operating point is selected in a certain stability reserve, and thereby led with this stability reserve during control. With changing grid conditions or boundary conditions in the grid, which for example temporarily reduce the stability reserve, the operating point is adapted accordingly so as to observe again the stability reserve.

According to one embodiment, the stability reserve is a minimum permissible distance of the operating point to the stability boundary, if the values describing the operating point and the stability boundary are standardized. For example, the stability boundary and also the operating point can be defined by the value of the fed-in reactive power, the fed-in active power, and the voltage at the grid connection point. Then, the active power can be standardized to the nominal capacity of the generator, and the reactive power can also be standardized to the nominal capacity of the generator. The voltage is preferably standardized to the nominal voltage. As a result, the values are without unit, and can be compared with each other, which is usually not easily possible with different units.

In the mentioned example, the stability boundary is a curved surface in a space, namely in the space which is formed if the reactive power, the active power and the voltage form a Cartesian coordinate system. In this illustrative example, the stability reserve can be another curved surface, which has, for example, a distance of 0.1 in principle. The stability reserve then, also vividly described, forms something similar to a buffer layer.

In mathematical terms, such a minimum permissible distance can be calculated, for example, by the root of the sum of the squares of the differences of each individual standardized value.

Preferably, different operating points are to be provided for different stability reserves. For example, the stability reserve of an optimum operating point with nominal voltage in which rated active power but no reactive power is fed-in may be selected as small. With other operating points, it may be useful to provide a greater safety distance. The buffer layer, identified as such for illustrative purposes, then does not have a consistent thickness. Such a varying or constant distance is preferably at least 0.05, 0.1 or in particular at least 0.2.

Preferably, during operation, the stability reserve of the actual operating point is constantly observed and, in particular, the operating point is changed if the distance to the stability reserve is reduced, especially if it falls below the value of the respective stability reserve. This observation can be made online or quasi-online, i.e., with small time differences between the observation times and/or through a dynamic observer with a slight time delay. This can be used to respond quickly and at very short notice to changes which are relevant to stability, and thus to secure a stable operation even near the stability boundary.

Furthermore, a wind power installation is proposed which comprises an electric generator coupled with an aerodynamic rotor to generate electric energy from wind, and comprising a frequency converter apparatus to feed the electric energy into the supply grid, whereby the wind power installation is controlled according to at least one method of the above described embodiments. Here, the wind power installation is a generator and is controlled to feed into the supply grid. Preferably, the frequency converter apparatus comprises a rectifier which rectifies the alternating voltage of the electric generator and comprises an inverter to transform the DC voltage into AC voltage to be fed into the supply grid. Such a frequency converter apparatus in which—disregarding losses—all the electric energy produced is completely led through the rectifier and through the inverter can also be referred to as a full power conversion concept or full power conversion topology. Instead of a rectifier, it is also possible to provide a combination of several rectifiers, and/or instead of a single inverter, several inverters can be provided which, in each case, only invert a part of the energy.

Preferably, the wind power installation is connected to the grid connection point, the electric energy produced is fed into the supply grid on this grid connection point, and a short circuit current ratio of <10, preferably <6, even more preferably <4, and in particular <2) is selected. Such a selection of a very small short circuit current ratio is made possible together with the respective control of the generator, namely the wind power installation, during the feed-in. Therefore, wind power installations with high connected loads, in particular high nominal capacities, can be connected to comparatively weak grids, and thus can often be set up at remote locations. As a result, it is now possible to use installation sites which have been unsuitable up to now, since their supply grid would have had to be adjusted significantly.

Preferably, a threatening loss of stability on the grid connection point is detected and/or shown. This is to avoid an interruption of the feed-in, or to prepare the generator for a quick return feeding in case of a loss of stability.

The threatening loss of stability is preferably detected or shown if the amount of a partial discharge of grid voltage exceeds a predetermined active power limit according to the fed-in active power.

By taking the partial discharge of the grid voltage according to the active power into consideration, a grid sensitivity can be detected, and the result of the discharge can be used as an indication to select a more stable operating point.

Preferably, a threatening loss of stability is detected or shown on the basis of an amount of a partial discharge of grid voltage, and according to the fed-in active power, if this amount of partial discharge exceeds a predetermined reactive power limit. Here again, the grid sensitivity is considered or determined.

Preferably, the threatening loss of stability is detected or shown by analyzing a 3-phase voltage of the supply grid according to the method of a symmetrical component, whereby a threatening loss of stability is assumed if the amount of a co-voltage component is larger than a co-voltage limit. In addition and alternatively, it is proposed to assume a threatening loss of stability if the amount of a counter voltage component is larger than a counter voltage limit. The known method of the symmetrical components takes asymmetries particularly into consideration. If the amount of the co-voltage component is monitored, it is monitored to the extent, in simple terms, that the symmetrical portion of the 3-phase voltage system exceeds or falls below a value. Through a consideration of a counter voltage component, it can be recognized in particular whether an asymmetry value is too high and indicates a fault in the grid, which can be expected to result in a loss of stability.

The amount of a difference between a reference frequency and a nominal frequency can also be considered. A threatening loss of stability can be assumed if the difference exceeds or falls short of a predetermined frequency limit or exceeds this by its absolute value.

Equally, a wind park with several wind power installations is proposed, whereby each wind power installation comprises an aerodynamic rotor, an electric generator, and a frequency converter apparatus, as described above. Furthermore, the operation of the park is proposed by means of a method, as described above, according to one of the embodiments. In this respect, the whole park is regarded and operated as a generator in the meaning of the described methods. In particular, the short circuit current ratio relates to the short circuit power ratio of the supply grid of the connection point with regard to the connected load of the wind park, in particular the sum of the nominal capacities of all wind power installations of the relevant wind park. It is also proposed, according to one embodiment, to design this wind park so that it has a low short circuit current ratio, in particular <10, <6, <4, and in particular, preferably <2. Particularly by combining several wind power installations into one wind park, large connected loads can be achieved, as opposed to individual wind power installations. For this purpose, a solution is now proposed allowing for a connection to a comparatively weak grid with regard to the connection point.

The grid sensitivity is important information for the provided control of the generator in feeding electric energy into the grid. This grid sensitivity is a characteristic related in particular to the grid connection point. It depends on the grid characteristics, such as the grid topology, but also on current grid conditions. It basically shows the degree of sensitivity with which the voltage reacts to influences on the grid connection point. If the generator is a wind power installation or a wind park with several wind power installations, the fluctuating wind velocity is an external factor which can, through the wind power installation, influence the grid, and thus the voltage on the connection point. Fluctuations of the wind velocity may have a strong or weak influence on the voltage on the connection point, and accordingly, there will be a strong or weak grid sensitivity with regard to the wind sensitivity.

Further, the current grid condition can have an impact on the sensitivity of the voltage at the grid connection point. For example, if the grid is less sensitive to external factors, the voltage at the grid connection point is more stable if the grid, in particular with regard to the grid connection point, functions in a stable operating point. Conversely, the voltage on the grid connection point can be more easily influenced if the grid functions in a less stable operating point, such as an operating point at which, in the case of a wind power installation, the plant is already supporting the grid.

For example, a wind power installation can support the grid by feeding in reactive power. Preferably, it is therefore proposed that the grid sensitivity be determined in accordance with the partial discharge of the voltage at the grid connection point according to the fed-in reactive power. If there is a strong voltage change at the grid connection point with a change in the fed-in reactive power, the result is a high grid sensitivity, i.e., the voltage can be more easily influenced.

Alternatively or additionally, it is proposed to determine the grid sensitivity on the basis of a partial discharge of the voltage at the grid connection point of the power generated by the wind power installation, namely the active power. The active power generated and fed in by the wind power installation is a measurement for the existent wind velocity. If a change of this fed-in power leads to a strong voltage change at the grid connection point, there is a high sensitivity with regard to this power, and thus with regard to changes of the wind velocity.

Preferably, the grid sensitivity is to be a sum of both of these partial discharges, whereby the summation can be weighted in order to consider or accept influences of varying strength.

It is now preferably proposed to control the generator based on this grid sensitivity. In particular, a control behavior can or should be performed quickly or with amplification if there is high sensitivity and if, in the case of external interferences, a quick reaction is required. On the other hand, with weak sensitivity, a slow controller or a controller with little power can be sufficient.

The load flow calculation described below is used to analyze stationary operating conditions of energy supply systems. The underlying basis is FIG. 9 of the respective grid through its impedances Z or its admittances Y (complex conductances).

The classical grid analysis determines the grid via Ohm's law with the following linear equation system in matrix notation, which describes a correlation for n-knots.

$$\begin{bmatrix} \underline{Y}_{11} & \cdots & \underline{Y}_{12} & \underline{Y}_{1i} & \cdots & \underline{Y}_{1n} \\ \underline{Y}_{21} & \cdots & \underline{Y}_{22} & \underline{Y}_{2i} & \cdots & \underline{Y}_{2n} \\ \vdots & & \vdots & \vdots & & \vdots \\ \underline{Y}_{n1} & \cdots & \underline{Y}_{n2} & \underline{Y}_{ni} & \cdots & \underline{Y}_{nn} \end{bmatrix} \begin{bmatrix} \underline{U}_1 \\ \underline{U}_2 \\ \vdots \\ \underline{U}_n \end{bmatrix} = \begin{bmatrix} \underline{I}_1 \\ \underline{I}_2 \\ \vdots \\ \underline{I}_n \end{bmatrix}$$

Or in short: $\underline{Y} \cdot \underline{U} = \underline{I}$ (linear equation system).

The aim is to determine voltages on each of the n-grid knots ($\rightarrow$voltage maintenance).

As the currents in the grids are unknown but the (planned) feed-ins and electric falls are known, the currents are expressed as outputs.

$$I_{ii} = \frac{S_i^*}{\underline{U}_i^*} = \frac{P_i - jQ_i}{\underline{U}_i^*}$$

Representing the grid equations via outputs results in the formation of a non-linear equation system.

$$\underline{S}_i^* = P_i - jQ_i = \underline{Y}_{i1}\underline{U}_1 U_i^* + \underline{Y}_{i2}\underline{U}_2 U_i^* \ldots -= U_i^* \sum_{k=1}^{n} \underline{Y}_{ik}\underline{U}_k$$

This non-linear equation system is solved numerically (usually by Newton's method). When solving the equation system numerically, it must be linearized. This is done by the partial discharges of the matrix elements on the basis of the unknown, namely still the amplitude ($U_2 \ldots U_n$) and the angle ($\delta_2 \ldots \delta_n$) of the knot voltages here.

The matrix with the partial discharges is called a Jacobian matrix. In order to solve the equation system, this must be invertible, i.e., regular.

$$\begin{bmatrix} \Delta P_2^{(0)} \\ \vdots \\ \Delta P_n^{(0)} \\ \vdots \\ \Delta Q_2^{(0)} \\ \vdots \\ \Delta Q_n^{(0)} \end{bmatrix} = \begin{bmatrix} \left(\frac{\partial P_2}{\partial \delta_2}\right)^{(0)} & \cdots & \left(\frac{\partial P_2}{\partial \delta_n}\right)^{(0)} & \left(\frac{\partial P_2}{\partial U_2}\right)^{(0)} & \cdots & \left(\frac{\partial P_2}{\partial U_n}\right)^{(0)} \\ \vdots & & \vdots & \vdots & & \vdots \\ \left(\frac{\partial P_n}{\partial \delta_2}\right)^{(0)} & \cdots & \left(\frac{\partial P_n}{\partial \delta_n}\right)^{(0)} & \left(\frac{\partial P_n}{\partial U_2}\right)^{(0)} & \cdots & \left(\frac{\partial P_n}{\partial U_n}\right)^{(0)} \\ \vdots & & \vdots & \vdots & & \vdots \\ \left(\frac{\partial Q_2}{\partial \delta_2}\right)^{(0)} & \cdots & \left(\frac{\partial Q_2}{\partial \delta_n}\right)^{(0)} & \left(\frac{\partial Q_2}{\partial U_2}\right)^{(0)} & \cdots & \left(\frac{\partial Q_2}{\partial U_n}\right)^{(0)} \\ \vdots & & \vdots & \vdots & & \vdots \\ \left(\frac{\partial Q_n}{\partial \delta_2}\right)^{(0)} & \cdots & \left(\frac{\partial Q_n}{\partial \delta_n}\right)^{(0)} & \left(\frac{\partial Q_n}{\partial U_2}\right)^{(0)} & \cdots & \left(\frac{\partial Q_n}{\partial U_n}\right)^{(0)} \end{bmatrix} \begin{bmatrix} \Delta \delta_2^{(0)} \\ \vdots \\ \Delta \delta_n^{(0)} \\ \vdots \\ \Delta U_2^{(0)} \\ \vdots \\ \Delta U_n^{(0)} \end{bmatrix}$$

Jacobian matrix

BRIEF DESCRIPTION OF THE SEVERAL VIEWS OF THE DRAWINGS

The invention is described in more detail below by embodiments as examples with reference to the accompanying figures.

DETAILED DESCRIPTION

Below, identical reference signs for similar, but non-identical elements may be provided, or they can also be provided for elements that are only illustrated schematically or symbolically, and that may have different details, but which are not relevant for the respective explanation.

Figure 1:
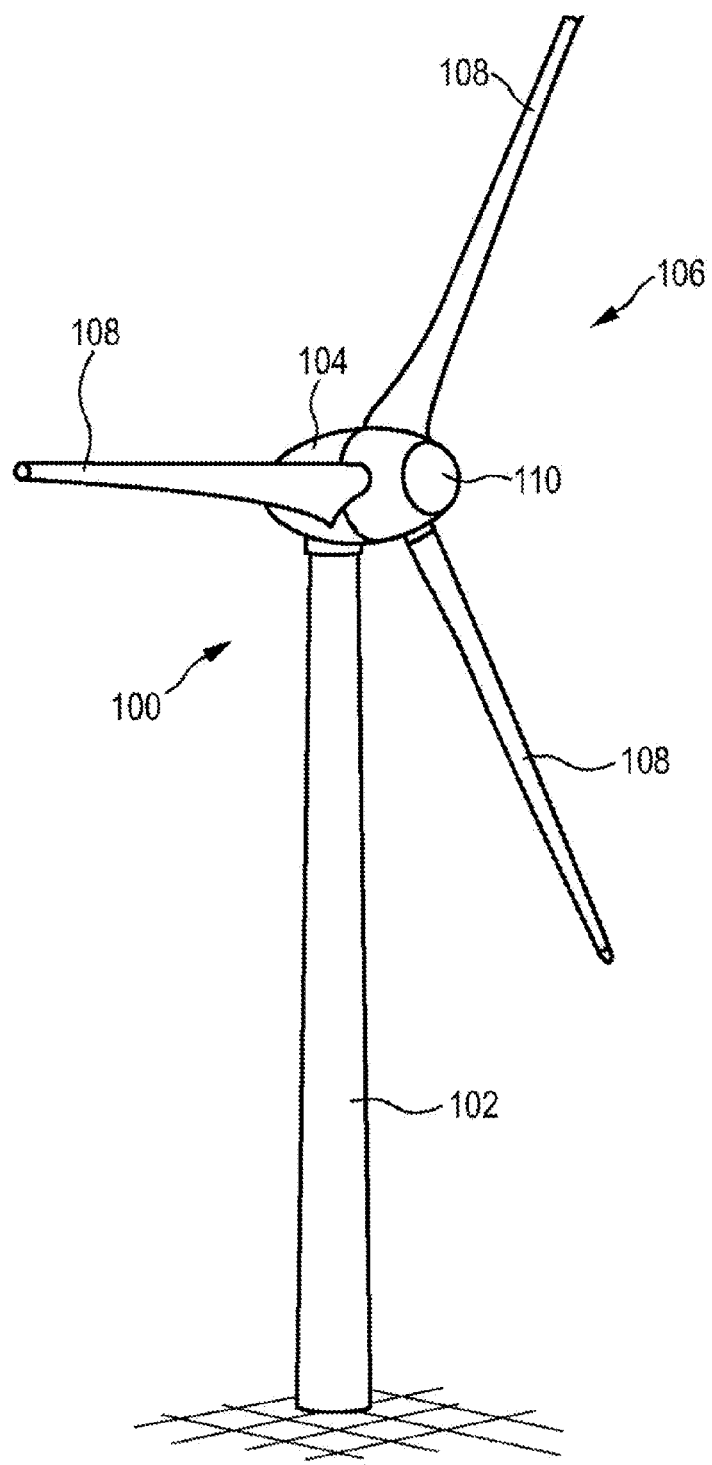
FIG. 1 shows a wind power installation in a perspective view.

FIG. 1 Shows wind power installation 100 with tower 102 and nacelle 104. Rotor 106 with three rotor blades 108 and spinner 110 is located on nacelle 104. Rotor 106 is set in operation by the wind in a rotating movement, thereby driving a generator in nacelle 104.

Figure 2:
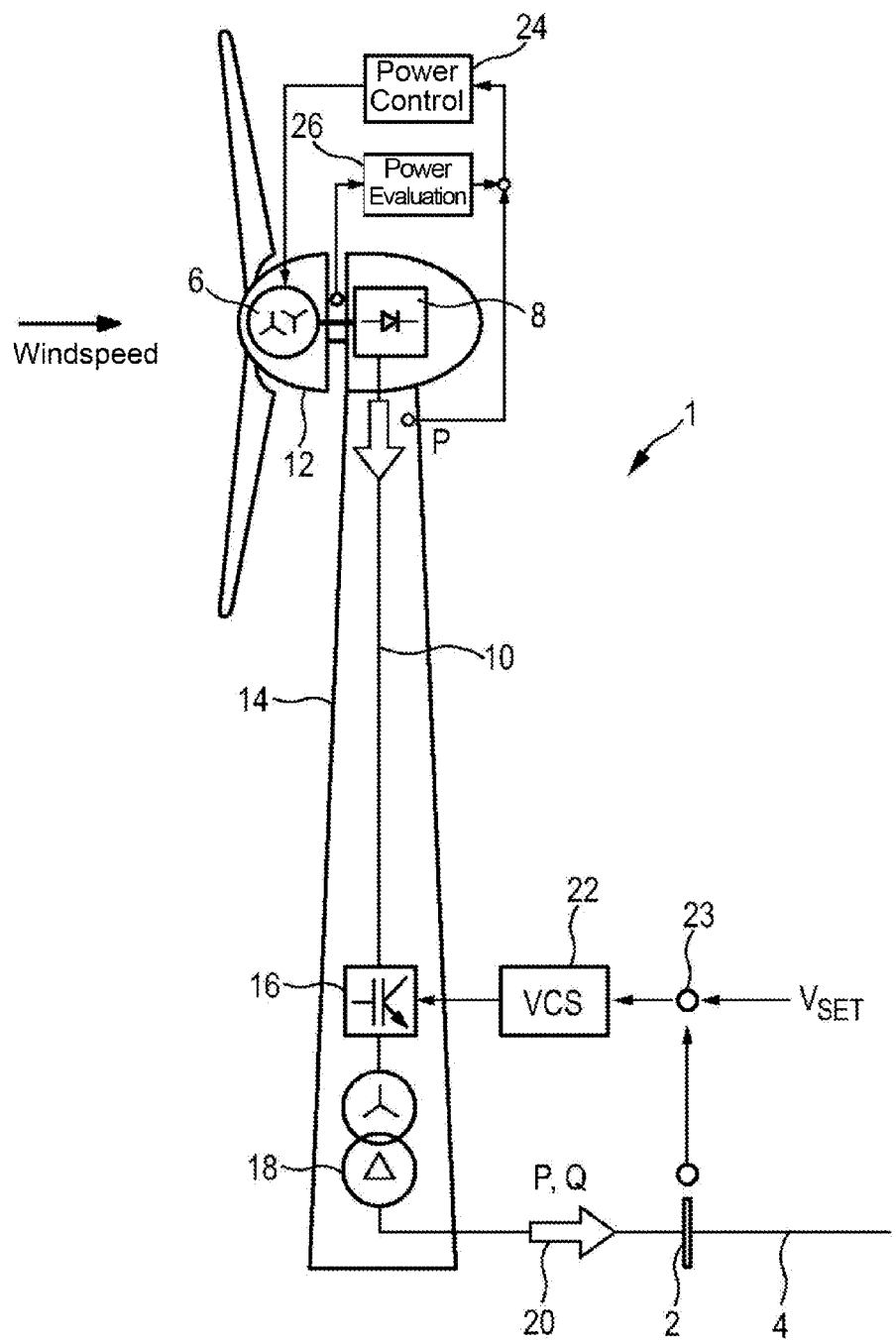
FIG. 2 shows a schematic view of a wind power installation that is connected to a grid, based on a voltage control system (VCS).

FIG. 2 shows a schematic view of a wind power installation 1 connected to electric supply grid 4 over grid connection point 2. Electric supply grid 4 is simply referred to as grid 4 or grid 4, whereby these terms are used synonymously.

Wind power installation 1 comprises generator 6, which is driven by the wind, thereby generating electric energy. In one of the embodiments, generator 6 is an electrically excited multiphase synchronous generator 6 with 2 respectively star-shaped interconnected 3-phase systems, which is illustrated by means of the two star symbols in generator 6 of FIG. 2. The generated alternating current, namely the 6-phase alternating current in the mentioned example, is rectified by rectifier 8, and transmitted as direct current via respective DC current line 10, which can comprise several individual lines, from nacelle 12 down tower 14 to inverter 16. Inverter 16 generates alternating current from the direct current, namely in the example shown, a 3-phase alternating current to be fed into grid 4. For this, the alternating current generated by inverter 16 is stepped up by means of transformer 18 so as to be fed into grid 4 on grid connection point 2. Illustrated transformer 18 uses a star delta connection, namely and primarily a star connection and, secondarily, a delta connection, which is illustrated here merely as an example of one embodiment. The feeding into grid 4 can also include, besides the feeding in of active power P, the feeding in of reactive power Q, which is illustrated by arrow 20. For the concrete feed-in, inverter 16 is controlled by respective control unit 22, whereby control unit 22 can be structurally combined with inverter 16. FIG. 2 is to illustrate the basic construction, and the specific arrangement of the individual elements can be chosen differently than illustrated here. For example, transformer 18 can be provided outside tower 14.

In particular, control unit 22 controls inverter 16 such that the manner of the feed into the grid 4 is controlled. Tasks are thereby performed, such as adjusting the power that is to be fed to the situation in grid 4, in particular the frequency, phase and amplitude of the voltage in the grid. In addition, control unit 22 is designed to control the portion of the active power P and reactive power Q of the power that is actually fed into grid 4. Here, measurements are performed in grid 4, in particular on grid connection point 2, and are evaluated accordingly. Among other things, the actual voltage in grid 4 is measured, in particular in the form of the actual effective value of the voltage, and compared with the default value for the voltage, namely default value $V_{SET}$.

Accordingly, the illustrated system, and in particular inverter 16 with control unit 22, form a voltage control system, which is abbreviated as VCS.

To control the generator of the wind power installation, power control block 24 and power evaluation block 26 are provided in the area of the nacelle. In the example of the illustrated embodiment, power control block 24 particularly controls the excitation, namely the excitation current of the separately excited synchronous generator. Power evaluation block 26 evaluates the power led to rectifier 8, and compares it with the output power released by rectifier 8 over DC current line 10 to inverter 16. The result of this evaluation is forwarded to power control block 24.

FIG. 2 also illustrates that the system shown should have a voltage control system for an intelligent feed-in so as to operate the wind power installation as stably as possible, in particular near a stability boundary.

Figure 3:
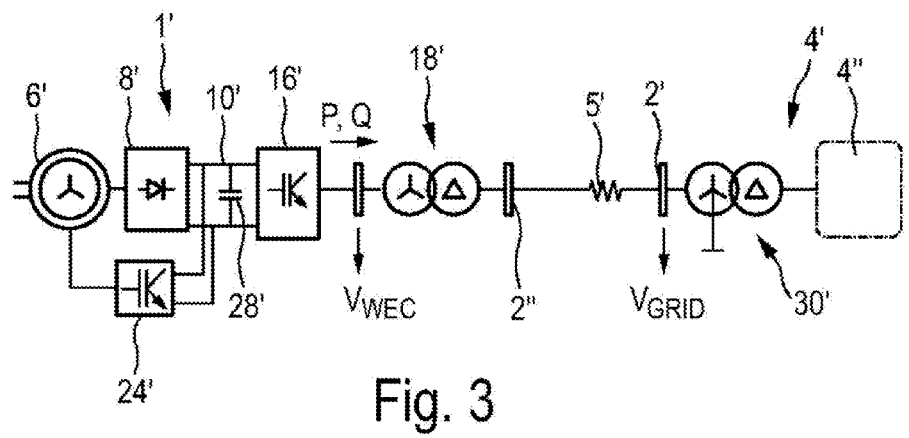
FIG. 3 shows a schematic view of a circuit arrangement of a voltage controlled feed-in of a wind power installation into an AC grid.

FIG. 3 illustrates the connection of wind power installation 1' to so-called "weak grid 4'". A weak grid here refers to a grid with high impedance. This is illustrated in FIG. 3 by means of serial impedance 5'. In addition, said serial impedance 5' was provided in a test structure that corresponds to the structure in FIG. 3, and which was used to examine the behavior of wind power installation 1' on weak grid 4'.

The structure of FIG. 3 assumes generator 6', which is driven by the wind and provided as a synchronous generator. The generated electric power of generator 6' is rectified in rectifier 8', and provided to inverter 16' on the input side on a DC link with intermediate circuit capacitor 28'. The structure shown compares DC line 10' with the DC intermediate circuit of inverter 16' on the input side to simplify the illustration. A DC line on the input side can indeed be electrically identical with an intermediate circuit, or a boost converter is provided on the input side, which is not explained in detail here. Rectifier 1' and inverter 16' can also be physically separated from each other, as already explained in FIG. 2 with regard to rectifier 8 and inverter 16.

Finally, exciter control 24' is provided, which can be fed with energy from the DC link that is represented by intermediate circuit capacitor 28'. Said exciter control 24' controls the excitation current of separately excited generator 6' and basically corresponds to power control block 24 of FIG. 2.

Inverter 16' can feed in active power P and/or reactive power Q. FIG. 3 states the voltage of inverter 16' on the output side as voltage of the wind power installation $V_{WEC}$. For the feed-in, this is stepped up by transformer 18, and then fed into grid 4' on grid connection point 2'. Here, grid 4' also comprises grid transformer 30'. The actual grid that starts after grid transformer 30' is specified with the reference sign 4". The voltage on grid connection point 2' is referred to as grid voltage $V_{grid}$.

To illustrate the weak grid, serial impedance 5' is shown in front of grid connection point 2'. Said serial impedance 5' exists only in this test structure or illustrating structure, and indicates the grid impedance. Therefore, the point shown directly next to transformer 18' can also be referred to as grid connection point 2". This differentiation between these two grid connection points 2' and 2" only results from this use of serial impedance 5', and usually does not exist in this form in real grids.

Figure 4:
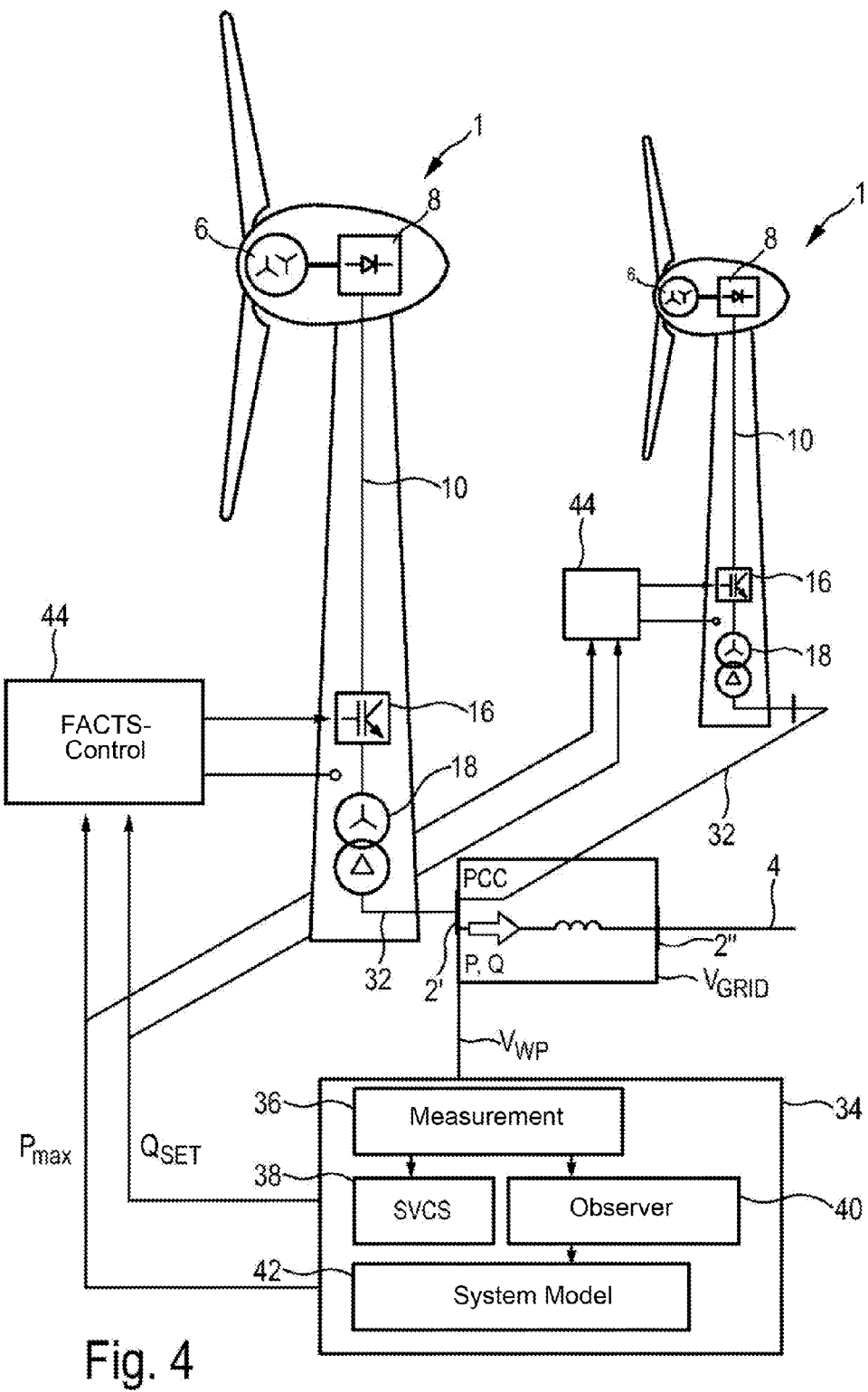
FIG. 4 shows a schematic view of two wind power installations connected to a grid over a joint grid connection point.

FIG. 4 shows another illustrative and schematic example, according to which two wind power installations 1 are connected to supply grid 4. Each wind power installation 1 is basically designed as explained in FIG. 2, namely with generator 6, rectifier 8 and DC line 10, which indeed comprises at least two individual lines, namely for positive and for negative current, which also applies to DC line 10 of FIG. 2. Furthermore, wind power installation 1 comprises inverter 16 and transformer 18. Access line 32 leads from each of the two wind power installations 1 to a or the grid connection point 2' on the wind power installation side. Thus, these two wind power installations 1 shown as examples, which can be representative for a wind park with far more than wind power installations, feed their generated power jointly on this grid connection point 2' on the wind power installation side. The fed-in power P and the fed-in reactive power Q, if present, is then led to connection point 2' on the grid side, and fed into electric supply grid 4.

The connection between grid connection point 2' on the wind power installation side and connection point 2" on the grid side cannot be ignored, and accordingly, the voltage $V_{WP}$ is reached on the wind power installation side on grid connection point 2' on the wind power installation side, whereas the voltage $V_{grid}$ is reached on connection point 2" on the grid side.

The voltage $V_{WP}$ on the wind power installation side is determined and evaluated in evaluation block 34 for control. The evaluation is at first performed in such a way that the measured values are recorded with measuring block 36. The measurement results are forwarded, amongst other things, to stability control block 38, which can also be referred to as SVCS (Stability Voltage Control System) block. Stability control block 38 calculates a default value $Q_{Set}$ for the reactive power that is to be provided. This reactive power that is to be reached is then transferred as respective default value to both wind power installations 1, and accordingly would be transferred to all wind power installations in one amount. This default value can be transferred as an absolute value, in particular if wind power installations 1 have the same size and are subject to the same wind conditions. However, it can also be provided as a default value, such as a percentage value which refers to properties of the respective wind power installation, e.g., as the nominal capacity of the relevant wind power installation.

Further, measuring block 36 transmits the values to observer block 40, which calculates further conditions on the basis of the determined measurement values, such as the fed-in active power or the fed-in reactive power, and transmits its results to system model block 42. Observer block 40 can also obtain or derive information on the power demand, if necessary.

The system model of system model block 42 is used to determine a maximum active power $P_{max}$ that is to be fed in, and to feed it to wind power installations 1. This maximum active power that is to be fed in can be provided as an absolute or relative value. It is noted that the illustration of evaluation block 34 is to explain the structure. In general, it is not necessary that evaluation block 34 be physically designed as an independent apparatus.

The preset reactive power $Q_{set}$ and the maximum active power $P_{max}$ are then transferred to the FACTS control block 44 of each wind power installation 1. The term "FACTS" is also used in the German language and is an abbreviation for "Flexible AC Transmission System". The FACTS control block 44 then implements the default values and controls inverter 16 accordingly, whereby it can also consider measurement values from the wind power installation conditions.

In particular, but not exclusively, evaluation block 34 can provide stability relevant defaults for a stable feed into grid 4. In particular, an operating point can be set that is favorable with regard to the amount of energy to be fed or with regard to the amount of power and stability. In particular, an operating point with a stability reserve can be determined here. Here, stability control block 38 can reach a stability reserve with regard to reactive power that is to be fed-in by means of a respective default of the reactive power $Q_{set}$.

Figure 5:
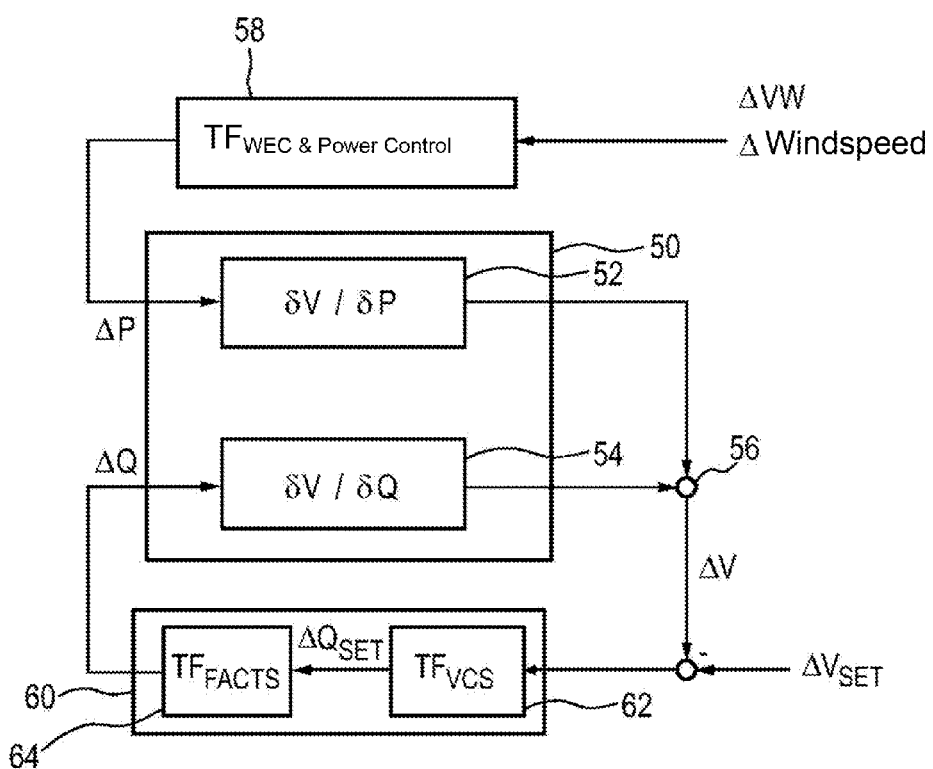
FIG. 5 illustrates parameters that can influence the sensitivity of a wind power installation connected to a grid.

FIG. 5 illustrates the sensitivity of a wind power installation connected to a grid and the corresponding influencing factors. Grid block 50 of FIG. 5 is specified representatively for the grid behavior, namely on the grid connection point. Grid block 50 illustrates that the grid can react to influences due to a change in voltage. All influences are illustrated here as changes of the active power ΔP and changes of the reactive power ΔQ. Active power block 52 considers influences of power changes, and reactive power block 54 considers influences of changes in reactive power. Active power block 52 shows a partial discharge of the voltage on the basis of the active power, and accordingly, reactive power block 54 shows a partial discharge of the voltage on the basis of the reactive power. This is a possibility to consider the respective dynamics of the grid behavior, i.e., the grid sensitivity, namely reactions to changes in the active power and the reactive power, by means of respective partial discharges, the results of which are added in summing block 56. Grid block 50 together with summing block 56 thus consider a dependency of the grid voltage at the grid connection point on two variables, namely the active power and the reactive power. The dependency is here considered by the partial discharges.

Changes in the active power result in particular from changes in the wind velocity ΔVW, which impacts wind power installation block 58. This wind power installation block 58 illustrates the influence of the change in wind velocity ΔVW upon the change in active power ΔP, whereby the control of the wind power installation is also to be considered, and is considered by this block 58.

The change in reactive power ΔQ can also depend on the wind power installation, or at least the control of the wind power Installation; however, it generally depends on other contexts that are independent of the wind velocity. Its change is illustrated by control block 60. For explanatory purposes, this control block 60 is divided into reactive power default block 62 and FACTS block 64. Control block 60, and thus reactive power default block 62, are initially dependent on a voltage deviation ΔV, namely on the grid connection point, less a predetermined voltage deviation $\Delta V_{SET}$. On the basis of this resulting voltage deviation, reactive power default block 62 determines a reactive power that is to be fed in or, depending on a voltage change, a predetermined change of the reactive power to be fed in. This is forwarded to FACTS block 64, which accordingly implements the feed-in of the reactive power or the change in the feed-in of the reactive power.

Wind power installation block 58 and control block 60 can also be understood as a transfer function of the respective input value, and reactive power default block 62 and FACTS block 64 can each be understood as individual transfer functions that are interlinked in control block 60.

Figure 6:
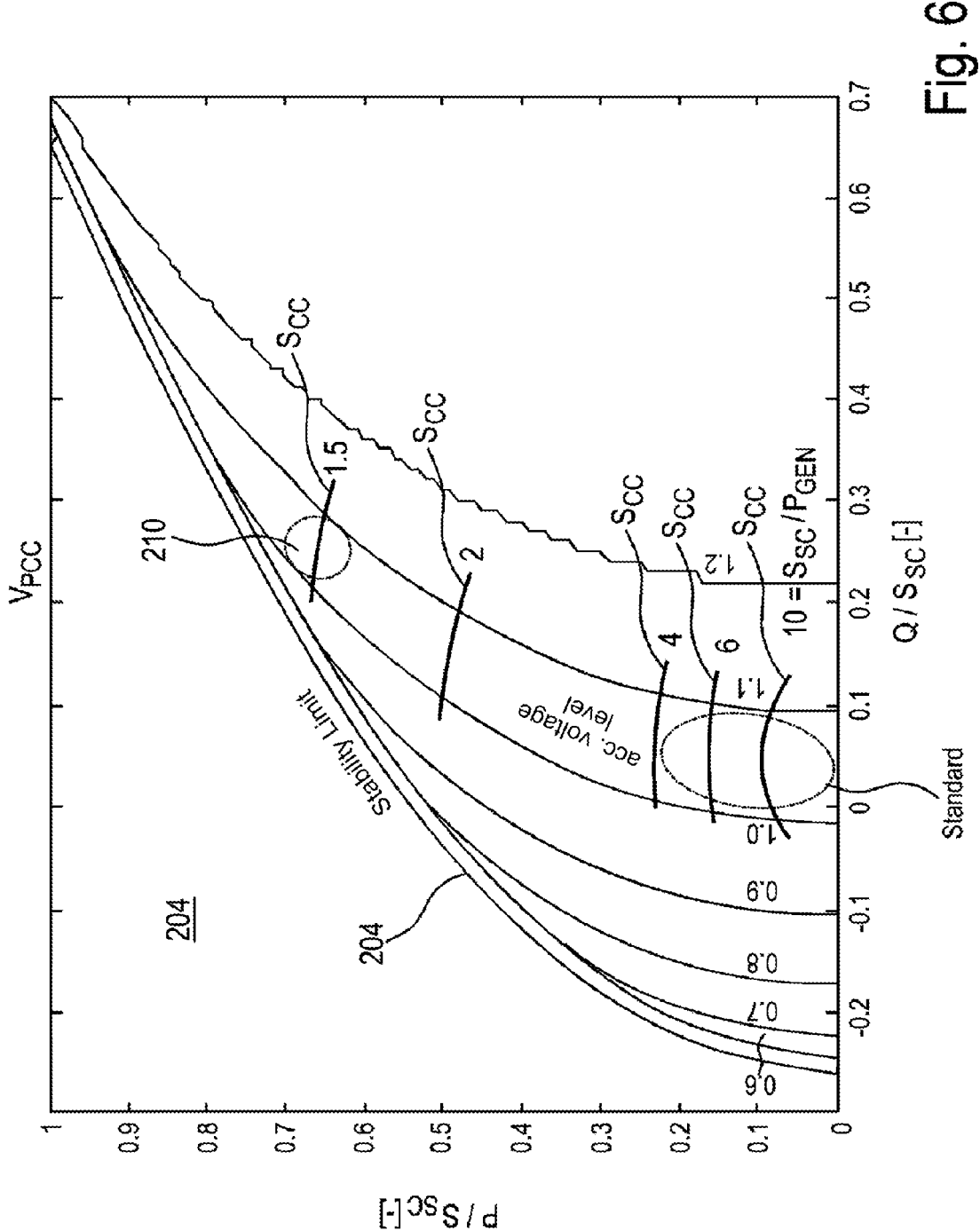
FIG. 6 shows a diagram analyzing the grid behavior on the grid connection point as voltage courses depending on the fed-in reactive power and fed-in active power.

FIG. 6 shows a dependency of the voltage for one embodiment at the grid connection point depending on the fed-in reactive power Q and fed-in active power P. Reactive power Q is standardized to the short circuit power $S_{SC}$ of the grid on the examined grid connection point, and plotted on the abscissa. Power P is also standardized to short circuit power $S_{SC}$ of the same grid connection point, and established on the ordinate. Voltage $V_{PCC}$ is the voltage at the grid connection point standardized to nominal voltage $V_N$. This standardized voltage at the grid connection point is plotted as a graph for different values respectively and depending upon standardized reactive power Q and standardized active power P. Accordingly, the graph or the characteristic with the value 1 is the characteristic representing the reactive power and active power values required to achieve nominal voltage.

For example, nominal voltage is achieved if 10% of reactive power Q and 50% of active power P is fed in with regard to short circuit power $S_{SC}$.

The graph of FIG. 6 shows characteristics of a grid connection point of a grid with high impedance, at least with regard to this grid connection point.

Usually, for the illustrated grid connection point of the grid example, a feed-in would be realized within a standard operating range 200. The feed-in would thus be realized with an active power P of approximately 10% of short circuit power $S_{SC}$, with a feed-in of approximately 5% of the reactive power of short circuit power $S_{SC}$. Under the idealized assumption that fed-in active power P corresponds to the rated power or connected load of the generator or the sum of the generators connected to the grid connection point, the feed-in of 10% of short circuit power $S_{SC}$ would mean that connected load $P_{Gen}$ is 10% of the short circuit power $S_{SC}$. Short circuit current ratio $Scr=S_{SC}/P_{Gen}$ is therefore approximately 10. This corresponds to approximately the center of the illustrated standard operating range 200. FIG. 6 shows further short circuit current ratios Scr as short dashes for orientation, namely for the values for Scr of 10; 6; 4; 2 and 1.5.

According to one or more embodiments of the invention, however, it is proposed to feed in significantly more active power P, namely within the range of 60% to 70% of short circuit power $S_{SC}$. Accordingly, a feed-in of 20% to 30% of reactive power Q related to short circuit power $S_{SC}$ is to be provided in order for this to maintain the voltage on the grid connection point within the range of 100 to 110% of the nominal voltage. As a precautionary measure, it is pointed out that the feed-in of 110% of the nominal voltage on the grid connection point does not mean that an increased voltage of 110% can be measured on the consumer side. Firstly, there is usually a considerable grid section between the grid connection point and the first relevant consumer. Secondly, step transformers can be provided in the grid, which can provide a balance to a certain extent. The measures to be taken thereon, which depend on the individual grid, including consumer and generator and various other framework conditions, cannot be addressed in this application. An expert is usually familiar with the required measures.

This proposed section is shown in FIG. 6 as increased operating range 210. This increased operating range has a short circuit current ratio Scr of approximately 1.5. No noteworthy generator has been connected to the grid so far with such short circuit current ratio.

The illustration of FIG. 6 is the result of a grid analysis of the underlying grid with regard to the relevant grid connection point. For this purpose, as explained above, the relevant elements in the grid were analyzed and determined respectively by solving the Jacobian matrix. This results in the present illustration of FIG. 6, according to which, in simple terms, the characteristics to the right side, i.e., with higher fed-in reactive power Q, also reflect increased voltages at the grid connection point. With decreasing reactive power Q, i.e., to the left side, the voltage at the grid connection point decreases. However, reactive power Q cannot decrease arbitrarily, and with too low (already negative) a reactive power Q, the Jacobian matrix becomes singular, according to the associated active power P, i.e., impossible to solve in mathematical terms. A singular Jacobian matrix means that there is an instable condition. This results in stability boundary 202, which is accordingly shown on the left-hand side of the illustration in FIG. 6. The area to the left of stability boundary 202 which has a higher active power P and/or a lower reactive power Q, respectively, is instable area 204. As a purely precautionary measure, it is pointed out that stability boundary 202 does not coincide with a single characteristic of a voltage value on the grid connection point, but rather seems to cut the family of characteristics. However, a family of characteristics cannot be cut, as there are no values, and thus no family of characteristics, beyond stability boundary 202.

The preferred operating range, namely increased operating range 210, has a smaller distance to stability boundary 202 than standard operating range 200. However, it should be noted that no specific considerations or analyses were made with regard to the grid characteristics, as shown in FIG. 6. In particular, the distance to a stability boundary, as it is shown in FIG. 6 as stability boundary 202, was not known, at least not in the quality and quantity shown in FIG. 6. Rather, the installation of large power plants has been oriented to the criterion of the short circuit current ratio, and this has been as large as possible, preferably over, or even significantly over 10. Small generators, such as wind power installations, have so far usually been connected to strong grids that were easily able to cope with the connection of another wind power installation. As a result, the connection was made, be it intentionally or not, with high short circuit current ratio $S_{SC}$.

The proposed solution accurately analyzes the grid with regard to the provided grid connection point, in particular by quantitatively incorporating contexts as shown in FIG. 6—and preferably in FIGS. 7 and 8, which will be explained below. In particular, such an analysis is performed by a repeated formation and solution of the Jacobian matrix for diverse points. Based on such a grid analysis, a stability boundary according to stability boundary 202 can be determined, and a desired operating range according to increased operating range 210 in FIG. 6 can be chosen.

In addition, it is proposed that the wind power Installation be controlled in the meaning of a closed control loop, as is shown in particular in FIG. 2 and FIG. 4. In FIG. 2, the control loop basically comprises inverter 16, transformer 18 and control unit 22, considers measurement values on grid connection point 2 and controls inverter 16 so as to achieve the fed-in active power P and the reactive power Q according to arrow 20. The control can also impact the control of the wind power installation in the area of generator 6; however, the described control loop comprising inverter 16, transformer 18 and control unit 22 does not require mechanical elements and is able to react very quickly. For this, the knowledge of the grid characteristics at the grid connection point, i.e., grid connection point 2 according to FIG. 2, can also be considered, in particular in control unit 22. Thus, a quick control can be implemented which recognizes the grid behavior on the grid connection point, particularly the stability boundary. This makes it possible to operate the wind power installation or the wind park—and other generators, if applicable—within a desired operating range, such as the increased operating range 210 of FIG. 6, and at the same time to ensure high stability and safety.

Figure 7:
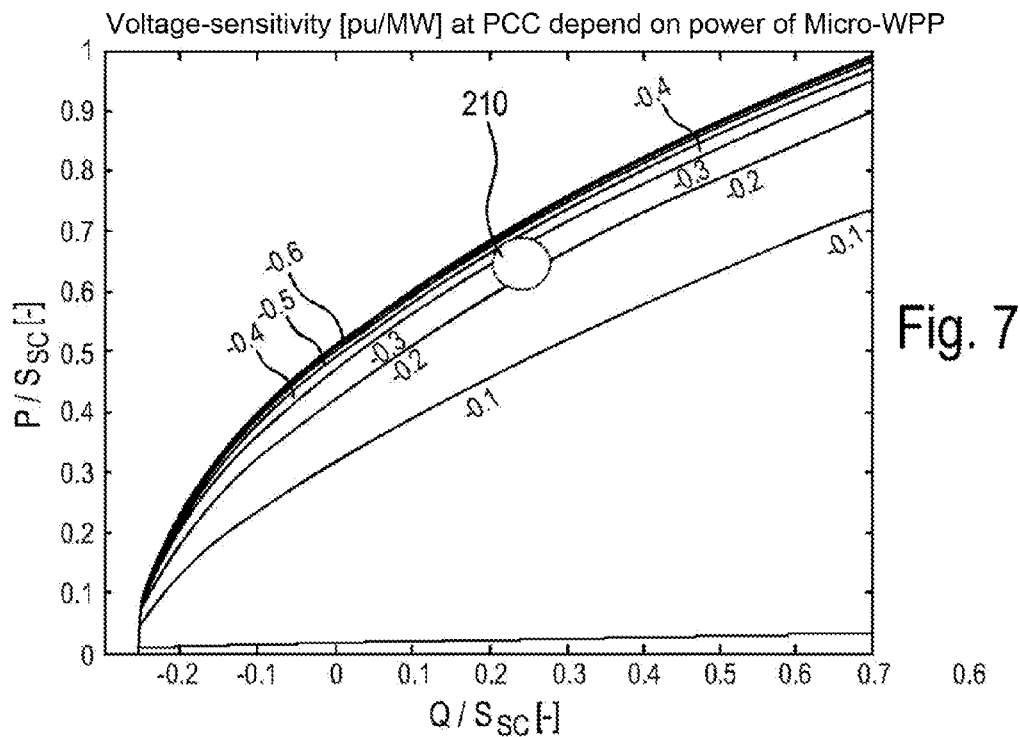
FIG. 7 shows a sensitivity as a voltage change caused by changes of the active power depending on the fed-in and standardized reactive power and active power.
Figure 8:
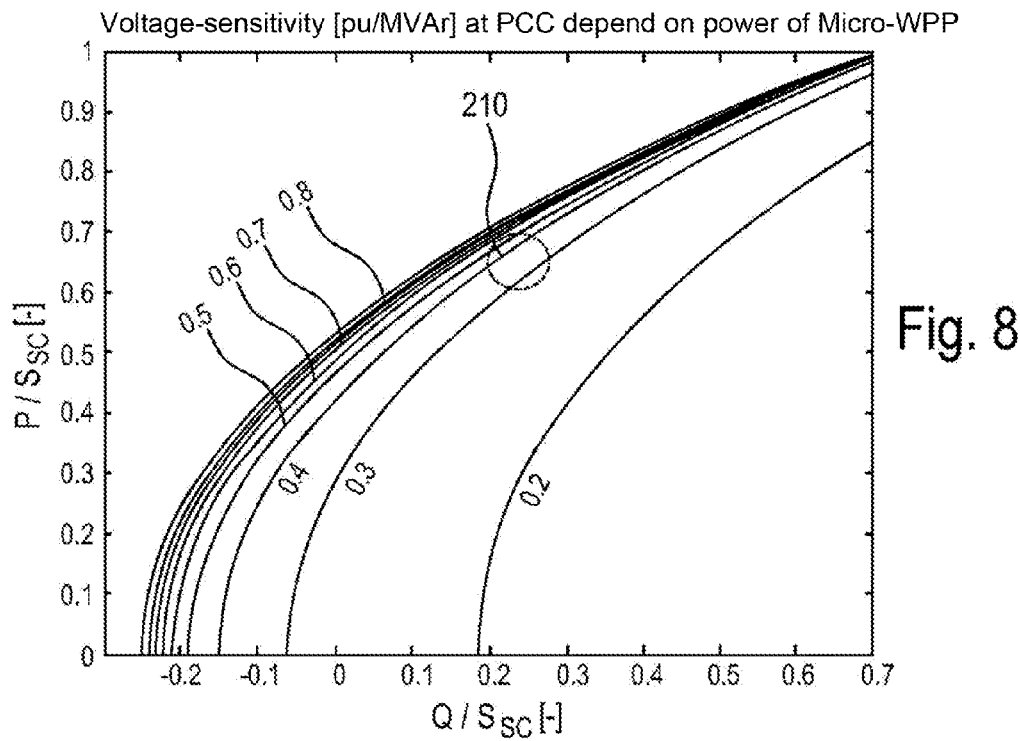
FIG. 8 shows a sensitivity as a voltage change caused by a change of the reactive power depending on the standardized reactive power and active power.
Figure 9:
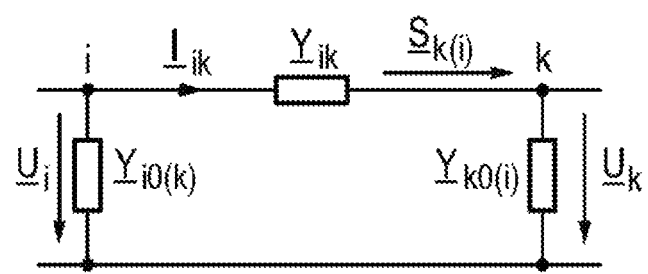
FIG. 9 shows a generalized grid illustration.

FIGS. 7 and 8 show the voltage sensitivity depending on reactive power Q and active power P. FIGS. 7 and 8 thus use the same values on the abscissa and the ordinate, namely standardized reactive power on the abscissa and standardized active power on the ordinate.

The voltage sensitivity shown is the change in voltage with the change in active power pursuant to FIG. 7 or the change in voltage with the reactive power pursuant to FIG. 8. In other words, the partial discharge of the voltage at the grid connection point according to the active power in FIG. 7 and the partial discharge of the voltage according to the reactive power in FIG. 8 are illustrated. FIG. 7 thus shows the behavior of active power block 52 of FIG. 5. FIG. 8 shows the behavior of reactive power block 54 of FIG. 5, whereby in both cases, the illustration is shown depending on the operating points, which are determined by the currently fed-in reactive power Q and the fed-in active power P. The values of the respective characteristics relate to a grid connection point with a short circuit power $S_{SC}$=3.73 MVA, to which two wind power installations with a rated power of 2 MW each are to be connected as an example. Thus, this test arrangement allows the performance of tests with a short circuit current ratio of a little less than 1. However, for the tests performed, the respective actual power of the test wind farm was used as a basis, and determined as a connected load of the target wind farm, i.e., the (fictitious) wind farm that is to be examined.

With regard to the present embodiment, i.e., the exemplary configuration, the change in the standardized voltage related to a change in power P in MW or a change in reactive power Q in MVAr is described. FIGS. 7 and 8 also illustrate the desired, i.e., the increased operating range 210. Therefore, the voltage sensitivity with regard to changes in active power according to FIG. 7 is approximately −0.2 to −0.4. The voltage sensitivity in increased operating range 210 with regard to changes in the reactive power according to FIG. 8 is approximately 0.3 to 0.5. It is therefore proposed that, when designing the wind power installation to be connected to the concrete grid connection point, to incorporate and consider this voltage sensitivity in the control with regard to changes in the active power, as shown in the example in FIG. 7 and/or with regard to changes in the reactive power, as shown in the example in FIG. 8. In particular, these values are to be considered in the control as well, and preferably also in the design of the control. Preferably, a controller amplification is chosen depending on the sensitivity, in particular the voltage sensitivity.

In particular, it is proposed to consider these values in the closed loop, as schematically realized by the elements shown in FIG. 2, i.e., inverter 16, transformer 18 and control unit 22. Here, transformer 18 is less important; however, it must frequently be present and required to feed in a respectively high voltage already on grid connection point 2. In particular, findings concerning the voltage sensitivity in control unit 22 are considered. This way, knowing these values, it is possible to design and implement a customized control for the concrete grid connection point. This makes it possible to reduce the previously high values of the short circuit current ratio of 10 and even higher, and to provide low values, such as 1.5 for the short circuit current ratio, and thus operate the wind power installation in the increased operating range 210, which is shown in FIGS. 6 to 8.

Embodiments of the invention thus proposes in particular that a wind power installation, and finally also a wind park, no longer be connected according to the old principle of the grid parallel operation, assuming that the grid capacity is sufficient, but rather that the connection point be specifically analyzed and that the results already be considered prior to the operation, and that a customized wind power installation or wind power installation park then be connected there. Preferably, the control and the operating range that is to be chosen, in particular with regard to the reactive power Q and the active power P to be fed in, are customized and arranged closer to a stability boundary than was previously done by experts. In so doing, the benefits of a wind power installation are used in a targeted manner, namely to respond rapidly and in a targeted manner to changes, in particular changes in grid conditions. This is to avoid an excessively large size of the grid, in particular of the specific grid connection point, at least for the connection of wind power installations to the grid. Nevertheless, it is possible to maintain and even improve stability if the control or regulator recognizes the characteristics of the grid connection point or the grid very well with regard to the grid connection point, and if it observes grid conditions.

As a purely precautionary measure, it is pointed out that a regulator is basically understood as a closed loop with feedback, whereby a control basically refers to an open "loop", i.e., a situation without feedback. Nevertheless, a control block that implements a control method, can be used in a control loop. With regard to the example in FIG. 2, this means that control unit 22 is a control to the extent that it comprises a certain control function or transfer function that can also be non-linear and/or volatile, and/or relate to several sizes. However, this control unit is used in the loop shown in FIG. 2, which basically comprises, besides control unit 22, inverter 16, transformer 18 and finally a measuring unit on grid connection point 2 with a unit of comparison 23. Control unit 22 controls the inverter and is therefore integrated in the closed loop, making it part of a control.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling an electric generator that is connected to an electric supply grid at a grid connection point, the method comprising:
incorporating at least one grid characteristic of the electric supply grid that is related to the grid connection point, wherein incorporating the at least one grid characteristic comprises:
incorporating a short circuit current ratio; and
incorporating a stability boundary that is a function of a grid voltage at the grid connection point based on a fed-in reactive power and a fed-in active power, the stability boundary representing a curved surface in a space formed by the grid voltage, the fed-in reactive power and the fed-in active power; and
controlling the generator in such way that the generator feeds power into the electric supply grid subject to the at least one incorporated grid characteristic.

2. The method according to claim 1 wherein the generator is a decentralized generator of a wind power installation or a wind park comprising several wind power installations, and feeds into the electric supply grid.

3. The method according to claim 1 wherein the generator is a generator of at least one wind power installation, and the method further comprising determining a grid sensitivity for the grid connection point that describes a current dependency of a voltage at the grid connection point based on a current wind velocity.

4. The method according to claim 3 wherein determining the grid sensitivity further includes:
initiating a first partial discharge of the voltage at the grid connection point according to power produced by the at least one wind power installation;
initiating a second partial discharge of the voltage at the grid connection point according to the fed-in reactive power, and
summing the first and second partial discharges.

5. The method according to claim 3 further comprising controlling the generator depending on the grid sensitivity, wherein when the grid sensitivity increases, a faster controller characteristic and a controller characteristic with a more powerful amplification is used and/or a non-linear controller is used.

6. The method according to claim 1 wherein incorporating the at least one grid characteristic comprises:
performing a grid analysis by the electric supply grid,
generating a model of the electric supply grid based on the grid analysis,
simulating a plurality of different operating points based on the grid model for the grid connection point, and
using the simulated different operating points as the at least one grid characteristic.

7. The method according to claim 1 wherein the stability boundary is stored in a table and is approximated with an analytical function.

8. The method according to claim 1 wherein incorporating the at least one grid characteristic comprises considering characteristics of the generator.

9. The method according to claim 3 further comprising detecting a threatening loss of stability at the grid connection point, wherein the threatening loss of stability is detected by at least one of:
a value of a partial discharge of a grid voltage according to the fed-in active power exceeds a predetermined value,
a value of a partial discharge of a grid voltage according to the fed-in reactive power exceeds a predetermined reactive value,
an analysis of a 3-phase voltage of the supply grid according to the method of the symmetrical component results in a value of a co-voltage component that is higher than the co-voltage limit,
an analysis of a 3-phase voltage of the supply grid according to the method of the symmetrical component results in a value of a counter voltage component that is higher or lower than the counter voltage limit, and
a value of a difference between a reference frequency and a nominal frequency exceeds a value of a predetermined frequency value.

10. The method according to claim 1 wherein the generator is controlled with the short circuit current ratio less than 6.

11. The method according to claim 1 wherein an operating point of the generator is selected with a predetermined stability reserve to the stability boundary.

12. The method according to claim 11 wherein the stability reserve to the stability boundary is at least one of the following:
a smallest difference between the fed-in reactive power and the reactive power of the stability boundary,
a smallest difference between the fed-in active power and the active power of the stability boundary, and
a smallest difference between the voltage at the grid connection point and the voltage of the stability boundary, or is calculated depending on at least one of the differences.

13. The method according to claim 11 wherein the stability reserve to the stability boundary is a root of a sum of one of the following:
   a square of a standardized smallest difference between the fed-in reactive power and the reactive power of the stability boundary,
   a square of a standardized smallest difference between the fed-in active power and the active power of the stability boundary, and
   a square of a standardized smallest difference between the voltage at the grid connection point and the voltage of the stability boundary,
   wherein the reactive power and the active power are standardized respectively according to a short circuit power of the supply grid at the grid connection point, and a voltage at the grid connection point is standardized according to a nominal voltage of the supply grid at the grid connection point.

14. The method according to claim 1 wherein a stability reserve of an actual operating point is observed by the stability boundary, and an operating point is changed when the stability reserve reduces to the stability boundary.

15. A wind power installation, comprising:
   an electric generator with an aerodynamic rotor to generate electric energy from wind; and
   a frequency converter apparatus coupled to the electric generator and a rectifier to feed electric energy from the electric generator into a supply grid,
   wherein the wind power installation is controlled according to the method of claim 1.

16. The wind power installation according to claim 15 wherein the wind power installation is connected to the grid connection point of the electric supply grid, and feeds electric energy into the electric supply grid through the grid connection point, and wherein the short circuit current ratio on the grid connection point is less than 10.

17. The method according to claim 1 wherein a loss of stability or an indication of a potential loss of stability depends on:
   the at least one incorporated grid characteristic;
   at least one grid condition; and
   a deviation of the control from a predetermined operating point.

18. The method according to claim 16 wherein the generator is a plurality of generators of a wind park comprising a plurality of wind power installations, and the loss of stability or the indication of the potential loss of stability is identified individually for each wind power installation or at least a sub-group of the plurality of wind power installation of the park.

19. The method according to claim 2 wherein the generator feeds into the electric supply grid by a voltage inverter.

20. The wind power installation according to claim 15 wherein the frequency converter apparatus is an inverter.

* * * * *